United States Patent [19]

King et al.

[11] Patent Number: 5,396,048

[45] Date of Patent: Mar. 7, 1995

[54] THERMOSTAT

[75] Inventors: Frederick J. King; William V. Rochat, both of Portland, Oreg.; Vance C. Mosher, Vancouver, Wash.

[73] Assignee: Cadet Manufacturing Company, Vancouver, Wash.

[21] Appl. No.: 872,698

[22] Filed: Apr. 23, 1992

[51] Int. Cl.⁶ .............................................. H05B 1/02
[52] U.S. Cl. .................................. 219/494; 219/492; 219/501; 219/481; 219/508
[58] Field of Search ............... 219/492, 493, 481, 482, 219/494, 507, 508, 511, 501; 307/117

[56] References Cited

U.S. PATENT DOCUMENTS

| | | | |
|---|---|---|---|
| 4,206,872 | 6/1980 | Levine | 219/492 |
| 4,338,511 | 7/1982 | Six | 219/501 |

*Primary Examiner*—Mark H. Paschall
*Attorney, Agent, or Firm*—Gordon M. Stewart

[57] ABSTRACT

A thermostat for cyclically regulating actual ambient temperature, Ta, to either of two values, T1 and T2, for selectable durations. A switch allows T1 to be selected and deselected and a sensor detects Ta, while a controller is connected to the switch and the sensor. The controller is capable of defining T1 and T2 values. The controller further has a memory to store a cycle period duration, a detector to detect when the switch selects or deselects T1, and a timer which establishes T1 duration based on the time between T1 selection and deselection, and establishes T2 duration as at least a portion of the remainder of the cycle period. The controller automatically cyclically repeats the established T1 and T2 durations during each cycle period until T1 is again selected by the switch. A signal generator in the controller generates a control signal corresponding to the difference between Ta and T1 or T2 during their respective durations. A power interface for a thermostat supplies power for thermostat components by a power control switch and a power storage circuit.

31 Claims, 2 Drawing Sheets

THERMOSTAT

FIELD OF THE INVENTION

The present invention relates to a thermostat for use with an electric heater to regulate ambient temperature, and a power interface useful in such thermostats,

TECHNOLOGY REVIEW

Various types of thermostats for heating or cooling systems are well known, Some thermostats are of the programmable type, allowing a user to save energy by automatically controlling ambient temperature to different user pre-selected values during various times of a day, Such programmable thermostats are designed for heating systems and a user would, in most cases, preselect a higher daytime than nighttime temperature. In the case of mechanical programmable thermostats, preselection of temperatures is often accomplished by plugging or unplugging a series of small pins into receptacles on a clock driven wheel. In the case of electronic programmable thermostats, pre-selection is made by manually entering temperature values by following an appropriate key entry sequence provided by the manufacturer's instructions.

In the case of an electric heater, such as a baseboard heater, and a remote thermostat (eg, a wall mounted thermostat), typically two electrical supply wires are required. These two wires are required to provide power from the usual line power supply to the thermostat components (eg. clock or electronic components). Additionally, a power control wire must be provided which runs from the power regulating device of the thermostat (for example a triac) to one side of the heater circuit (the other side of the heater being connected to the other side of the line supply).

SUMMARY OF THE INVENTION

The present invention provides a thermostat which cyclically regulates ambient temperature between two values. The timing of the active temperature setting may be pre-selected by a user simply by pushing a button only twice on the first day of operation (or whenever a user desires to reset this timing). The present invention further provides a power interface for a thermostat, such that the thermostat can be connected to an electric heater solely by interposing it between one side of the power source and the heater. The power interface is designed to provide power for the thermostat components without the necessity of an additional power supply line.

A thermostat of the present invention which can cyclically regulate ambient temperature, Ta, to either of two values, T1 and T2, for selectable durations, has a switch for selecting and deselecting T1. The switch can conveniently, but need not necessarily, be a pushbutton switch. The thermostat is also provided with a sensor, such as a thermistor, to detect Ta. A controller is also provided as a component of the thermostat preferably in the form of a microcontroller and associated appropriate circuitry. The controller has a selector which allows T1 to be defined by a user and a means for defining T2, which means may simply be appropriate programming in the controller which defines T2 as T1 minus a fixed value (eg. 15° F.). The controller further includes a memory, a detector, a timer, and a signal generator. The memory, again preferably provided by the microcontroller and associated circuitry, stores a cycle period duration. The foregoing duration, for a typical thermostat, is fixed at 24 hours, The detector detects when the switch selects or deselects T1. The timer establishes T1 duration based on the time between T1 selection and deselection. This does not necessarily mean that T1 duration is equal to such timespan and in fact is preferably such timespan plus a constant initial time (i.e. the constant is added to the beginning of foregoing timespan), such as no more than 1 hour and preferably about 15 minutes. The timer further establishes T2 duration as at least a portion of, and preferably as equal to, the remainder of the cycle period, and automatically cyclically retirees the established T1 and T2 durations during each cycle period until T1 is again selected by the switch. The signal generator generates a control signal corresponding to the difference between Ta and T1 or T2 during their respective durations. The thermostat further includes a power interface for connection to the heater and which provides heater power of a value or duration corresponding to the foregoing control signal. Since typically the heater is run from a standard 60 hz A.C. line, the power interface will preferably include a triac and the control signal thereto will control the number of cycles over a time period which are allowed to flow through the triac to the heater.

The power interface of the present invention provides a means for a thermostat operating an electrical load, typically an electric heater, to be supplied with power for thermostat components without the necessity of an additional line from a power source. Thus, such a thermostat can simply be wired between one leg of the power source and the load. The interface includes both a power storage circuit connectable across a power control switch. The interface may also include such switch. The power control switch, such as a triac, is connectable between a first side of a load (eg. electric heater) and a first side of a power source (typically A.C. power lines) and controls power through the power control switch (and hence a heater) in response to a control signal (eg. in the case of a triac, the signal which operates its gate). A power storage circuit, preferably in the form of a capacitor and associated charging circuit, provides power for thermostat components and is connected across the switch so as to be charged when the power control switch is off. That is, the low impedance of the load and the relatively low current requirements of the thermostat components, result in almost the full power source voltage being available across the power control switch when it is in the non-conducting state as a result of the control signal.

In the typical situation where the power source is a standard 120 or 240 volt A,C. power line, the capacitor charging circuit will include a voltage reduction circuit to reduce line voltage (eg. to around 20 volts or less) as well as a rectifier, Additionally, a voltage regulator is preferably provided so as to regulate voltage between the power storage circuit and thermostat components. For example, with thermostat components including typical integrated circuits, the voltage regulator will regulate voltage to 5 volts.

DRAWINGS

Embodiments of the invention will now be described with reference to the Drawing which shows a schematic of a thermostat, including power interface, of the present invention.

DETAILED DESCRIPTION OF EMBODIMENTS OF THE INVENTION

Figure 1A:
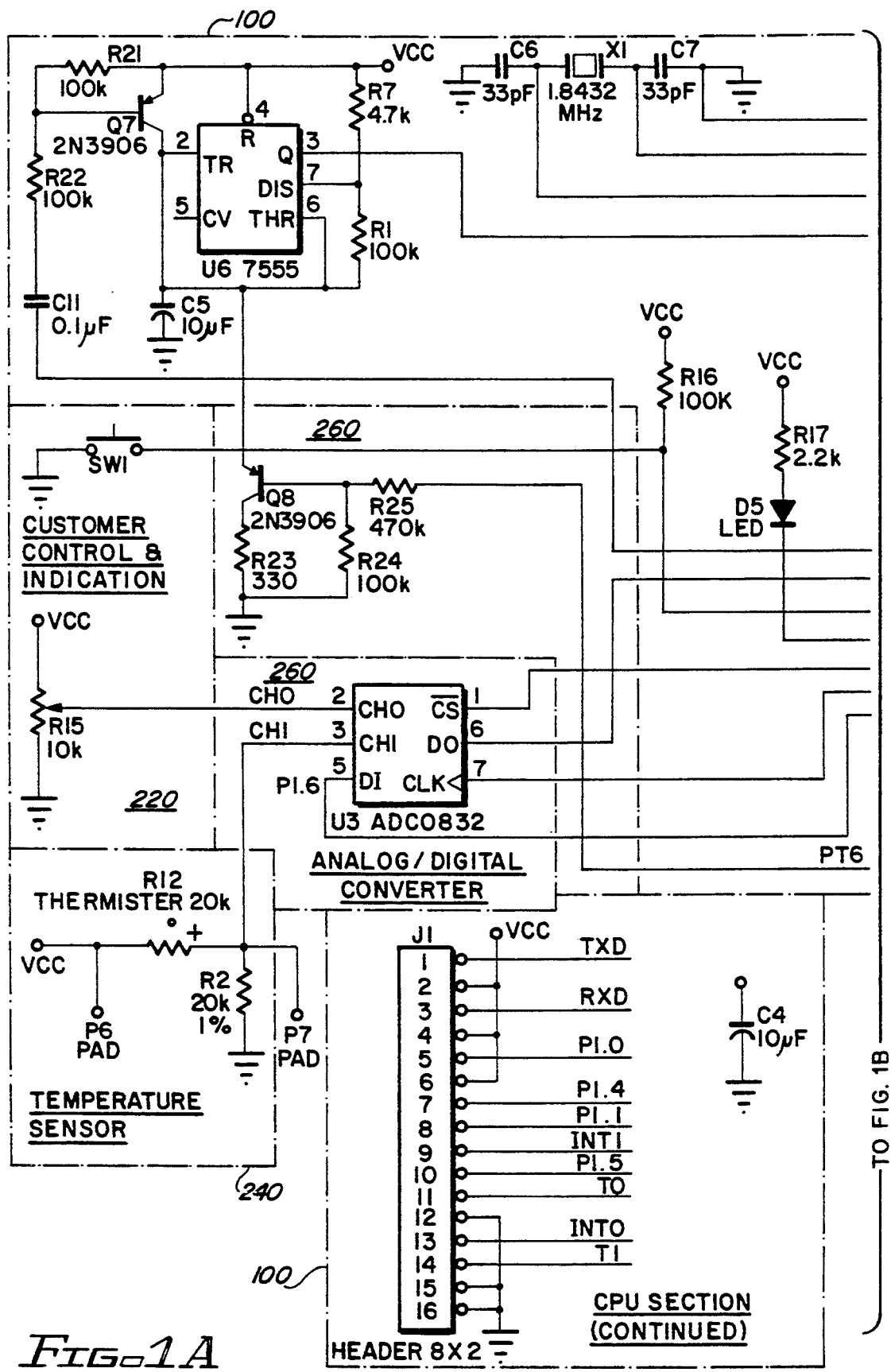
Figure 1B:
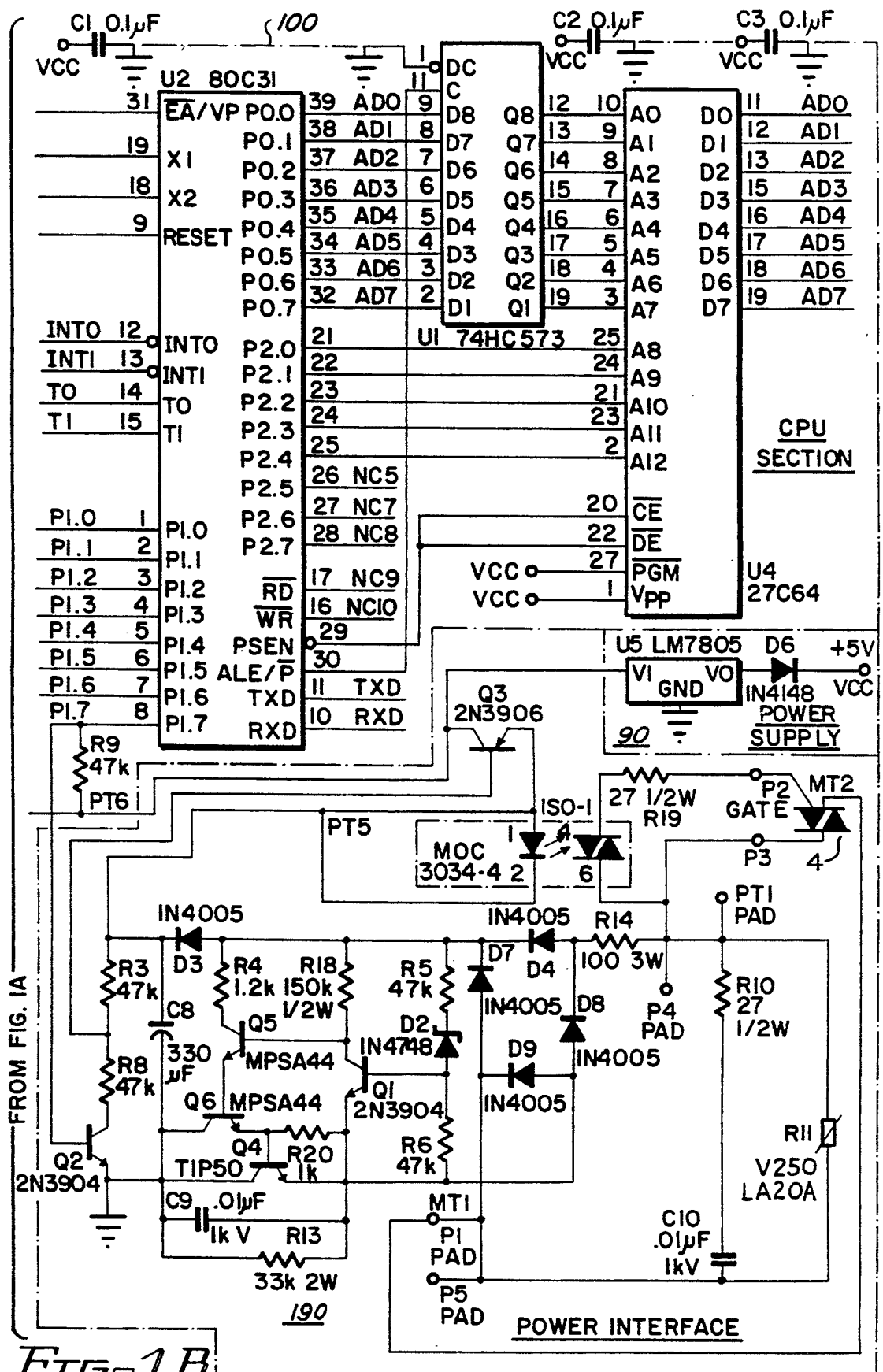

The thermostat of the Figure is designed to run an electric heater from a standard 120 volt 60 Hz A.C. line, in order to regulate Ta to either of two values T1 and T2. The thermostat shown in the Figure consists of five main sections, each outlined in broken lines. These sections are power interface 2, power supply 90, central processing unit ("CPU") 100, customer control and indication section 220, temperature sensor section 240 and analog-digital converter ("A/D converter") 260. CPU 100, customer control and indication section 220, and A/D converter 260 together form the controller of the thermostat. The thermostat of the Figure is laid out on a printed circuit board and would be mounted in a housing (not shown) with only the customer control and indicator section 220 being visible to the typical user. Specifically, R15 is in the form of a dial setting for user selection of a desired ambient temperature, Ta. Pushbutton switch SW1 is also accessible for user selection and deselection of a first desired ambient temperature, T1, while light emitting diode D5 indicates to a user whether the thermostat is regulating Ta to T1 or T2.

The components of the thermostat and their interconnection, are identified in detail in the Figure. The construction of the thermostat will be further understood in view of the below description of its use and operation.

To the user the thermostat is a wall mounted box with a dial for setting the desired room temperature and a pushbutton for selecting and deselecting one of two desired temperatures, T1 and T2 (i.e. a temperature "setback" mode will be established based on when the pushbutton is pushed). The thermostat is connected in the same manner that the old style bimetal controllers are connected, and can be thought of as replacing a simple switch to turn an electric heater on and off. In use, the wires that would be connected to such a switch will be connected to pad connection points P4 and P5 in power interface 2. These connection points are also the connections to a power control switch in the form of triac 4, which may be part of the thermostat or mounted slightly remotely from it. A remote mounting of triac 4 allows for heat dissipation from triac 4. Thus, when the thermostat is connected to the heater and power line, triac 4 will be connected in series between one side of the line and one side of the heater.

While triac 4 is OFF, the voltage across it will be very near that of the line voltage. While the triac is being held OFF and the line voltage crosses 0 volts and begins to increase, a charging circuit which includes dropping resistor R14 and a full-wave rectifier circuit of D4, D7, D8 and D9, directs current to charge capacitor C8 through D3. As line voltage continues to increase, current passing through R5, D2 and R6 increases until Zener Diode D2 reaches its breakdown voltage of 20 volts. When D2 breaks down Q1 is turned on which then turns off Q5, Q6 and Q4, thus breaking the charge path for C8. C9 and R13 provide some filtering to protect the switching components Q4 and Q6.

With the component values illustrated in the Figure, the energy stored in capacitor C8 during a given line cycle will be sufficient to supply power to the thermostat components of CPU section 100, customer control and indication and temperature sensor sections 220 and 240, and A/D convertor 260 during the remainder of the cycle (when triac 4 may be on) and with sufficient to spare for several subsequent line cycles. Further, capacitor C8 will be charged periodically, specifically each 15 cycles. It will be noted that the foregoing energy is supplied to thermostat components through a voltage regulator U5 of power supply section 90, which supplies a regulated +5 volts.

Power interface 2 includes an optical coupler ISO1 which serves to isolate between the high voltage line and the low voltage control circuitry. Since the current needed to run the microprocessor U2 and associated circuits is the same as that needed to run the optical coupler ISO1, opto coupler ISO1 is switched into and out of the low voltage power regulator current path in accordance with when triac 4 is to be turned on or off as determined by a control signal through line 190 from microcontroller U2. Switching has the effect of reducing the total current requirements of power supply U5 from what would otherwise be required absent switching. The components of power interface 2 which accomplish such switching while switching triac 4 on and off in accordance with the control signal on line 190, are Q2, Q3, R3, and R8. Resistor R14 limits current in the case of failure of any component of the charging circuit for capacitor C8.

The triac control signal supplied through line 190 from microcontroller U2 results as follows. With power supplied to thermostat components from power interface 2 and voltage regulator section 90, microcontroller U2 will read a temperature sensor R12 via A/D convertor U3. Microcontroller U2 is pre-programmed such that, in accordance with its programming, it tailors control signal 190 over time to begin to control the room temperature at ten degrees below the Dial setting, R15. As a result, triac 4 and the connected electric heater is turned on and off for varying amounts of time. Heater control is performed by the microcontroller via Q2 and R8 which switches Q3 to redirect operational current through ISO-1 to cause the remote mounted triac 4 to turn ON, as already described, If a pushbutton SW1 is pressed (i.e. T1 is selected), microcontroller U2 will turn on an indication light emitting diode D5, and raise the room temperature to the Dial setting (the T1). At the same time an internal timer is initialized. When pushbutton SW1 is pressed a second time (i.e. T1 is deselected), room temperature will be allowed to drop to ten degrees below the Dial setting again (i.e. the T2 value which is T1 minus 10° F.), the internal timer value is stored, and the indicating light will be extinguished. Of course, the operation of the indicating light may be reversed if desired such that it is turned off when T1 is selected and turned on when T1 is deselected. If pushbutton SW1 is not pushed again and there has been no power outage, then 23 hours and 45 minutes after pressing the pushbutton the first time, the controller will raise the room temperature to the Dial setting (i.e. T1). The controller will maintain the room temperature at T1 for the duration of time that the indicator was lit plus the initial 15 minutes. That is, T1 duration will be the time between T1 selection and deselection by SW1 plus an initial 15 minutes. The foregoing cycle repeats every 24 hours until a new cycle is initiated by pressing pushbutton SW1 again or line power is lost. The purpose of the initial additional 15 minutes, of course, is to allow that time for the room to be warmed to the T1 temperature.

It will be seen then that T1 duration is established as the time between T1 selection and deselection by SW1 plus an initial 15 minutes, while T2 duration is established as the 24 hour cycle period minus T1 duration. It will also be appreciated that in use, T1 will be a typical desired daytime temperature for a room while T2 will be the nighttime temperature.

It will be appreciated that modifications to the embodiment of the thermostat described above are, of course, possible without departing from the present invention. For example, pushbutton switch SW1 could be replaced by another type of switch although for simplicity of operation a pushbutton is preferred. Also, the initial 15 minute period added to the time between T1 selection and deselection by SW1 to establish T1 duration, could be varied depending on the anticipated power of the heater and typical room in which it would be used. Additionally, a means could be provided for defining T2 other than as T1 minus a fixed value, such as a second user variable dial for T2. However, such an arrangement would again detract from operational simplicity. Further modifications and alterations are of course possible within the scope of the present invention.

We claim:

1. A thermostat which generates a control signal for cyclically regulating actual ambient temperature Ta, to either of two values, T1 and T2, for selectable durations, comprising:
   (a) a switch for selecting and deselecting T1;
   (b) a sensor for detecting Ta;
   (c) a controller connected to said switch and said sensor, said controller having:
   a means for defining T1 and T2 values;
   a memory to store a cycle period duration;
   a detector to detect when the switch selects or deselects T1;
   a timer which establishes T1 duration based on the time between T1 selection and deselection, and establishes T2 duration as an least a portion of the remainder of the cycle period, and automatically cyclically repeats the established T1 and T2 durations during each cycle period until T1 is again selected by the switch;
   a signal generator which generates a control signal corresponding to the difference between Ta and T1 or T2 during their respective durations.

2. A thermostat as defined in claim 1 wherein the means for defining T1 and T2 values comprises a T1 selector which allows T1 to be varied by a user.

3. A thermostat as defined in claim 2 wherein the cycle period duration stored by said controller is 24 hours.

4. A thermostat as defined in claim 3 wherein said timer establishes T1 duration as the time between T1 selection and deselection plus an initial period of no more than 1 hour.

5. A thermostat as defined in claim 3 wherein said timer establishes T1 duration as the time between T1 selection and deselection plus an initial period of about 15 minutes.

6. A thermostat as defined in claim wherein the means for defining T1 and T2 values defines T2 as T1 minus a numerical value.

7. A thermostat as defined in claim 3 wherein said timer establishes T2 duration as the cycle period minus T1 duration.

8. A thermostat as defined in claim 2 wherein the switch for selecting and deselecting T1 is a pushbutton switch.

9. A thermostat as defined in claim 7 wherein the cycle period duration stored by said controller is 24 hours.

10. A thermostat as defined in claim 9 wherein T1 duration is established as the time between T1 selection and deselection plus an initial period of no more than 1 hour.

11. A thermostat as defined in claim 10 wherein the means for defining T1 and T2 values defines T2 as T1 minus a numerical value.

12. A thermostat as defined in claim 11 wherein said timer establishes T2 duration as the cycle period minus T1 duration.

13. A thermostat for cyclically controlling an electric heater to regulate actual ambient temperature, Ta, to either of two values, T1 and T2, for selectable durations, comprising:
   (a) a switch for selecting and deselecting T1;
   (b) a sensor for detecting Ta;
   (c) a controller connected to said switch and said sensor, said controller having:
   a selector which allows T1 to be defined by a user;
   a means for defining T2 value;
   a memory to store a cycle period duration;
   a detector to detect when the switch selects or deselects T1;
   a timer which establishes T1 duration based on the time between T1 selection and deselection, and establishes T2 duration as at least a portion of the remainder of the cycle period, and automatically cyclically repeats the established T1 and T2 durations during each cycle period until T1 is again selected by the switch;
   a signal generator which generates a control signal corresponding to the difference between Ta and T1 or T2 during their respective durations;
   (d) a power interface for connection to the heater which provides heater current of a value or duration corresponding to the control signal.

14. An electric heating system comprising an electric heater and a thermostat connected to said heater to regulate actual ambient temperature, Ta, to either of two values, T1 and T2, for selectable durations, said thermostat comprising:
   (a) a switch for selecting and deselecting T1;
   (b) a sensor for detecting Ta;
   (c) a controller connected to said switch and said sensor, said controller having:
   a selector which allows T1 to be defined by a user;
   a means for defining T2 value;
   a memory to store a cycle period duration which is 24 hours;
   a detector to detect when the switch selects or deselects T1;
   a timer which establishes T1 duration based on the time between T1 selection and deselection, and establishes T2 duration as at least a portion of the remainder of the cycle period, and automatically cyclically repeats the established T1 and T2 durations during each cycle period until T1 is again selected by the switch;
   a signal generator which generates a control signal corresponding to the difference between Ta and T1 or T2 during their respective durations;
   (d) a power interface connected to the heater which provides heater current of a value or duration corresponding to the control signal.

15. An electric heating system as defined in claim 14 wherein the means for defining T1 and T2 values defines T2 as T1 minus a numerical value, and wherein said timer establishes T1 duration as the time between T1 selection and deselection plus an initial period.

16. An electric heating system as defined in claim 14 wherein said timer establishes T2 duration as the cycle period minus T1 duration.

17. An electric heating system as defined in claim 14 wherein the switch for selecting and deselecting T1 is a pushbutton switch.

18. A thermostat for controlling an electrical load, said thermostat having a power interface comprising:
  (a) a power control switch connectable between a first side of the load and a first side of a power source for the load, and which controls power therethrough in response to a signal; and
  (b) a power storage circuit to provide power for thermostat components and which is connected across the switch so as to be charged when the power control switch is off.

19. A thermostat as defined in claim 18, wherein said power storage circuit comprises a capacitor and associated charging circuit.

20. A thermostat as defined in claim 19 wherein the capacitor charging circuit includes a rectifier and the capacitor is connected across the power control switch through the rectifier.

21. A thermostat as defined in claim 19 wherein the capacitor charging circuit additionally includes a voltage reduction circuit to reduce the maximum voltage to which the capacitor can be charged below that of the power source, and wherein the power interface additionally comprises a voltage regulator connected to regulate voltage between the power storage circuit and thermostat components.

22. A thermostat for controlling an electrical load to regulate ambient temperature to a desired value, said thermostat comprising:
  (a) a sensor for detecting ambient temperature;
  (b) a controller connected to said switch and said sensor, said controller having a signal generator which generates a control signal corresponding to the difference between the ambient and desired temperature;
  (c) a power interface for use with a power control switch which can control power therethrough in response to the control signal, the power interface having a power storage circuit to provide power for thermostat components and which is connectable across the switch so as to be charged when the power control switch is off.

23. A thermostat as defined in claim 21, wherein said power storage circuit comprises a capacitor and associated charging circuit.

24. A thermostat as defined in claim 22 wherein the capacitor charging circuit includes a rectifier and the capacitor is connectable across the power control switch through the rectifier.

25. A thermostat as defined in claim 23 wherein the capacitor charging circuit additionally includes a voltage reduction circuit to reduce the maximum voltage to which the capacitor can be charged below that of the power source, and wherein the power interface additionally comprises a voltage regulator connected to regulate voltage between the power storage circuit and thermostat components.

26. A thermostat for cyclically regulating actual ambient temperature, Ta, to either of two values, T1 and T2, for selectable durations, comprising:
  (a) a switch for selecting and deselecting T1;
  (b) a sensor for detecting Ta;
  (c) a controller connected to said switch and said sensor, said controller having:
    a means for defining T1 and T2 values which includes a T1 selector which allows T1 to be varied by a user
    a memory to store a cycle period duration;
    a detector to detect when the switch selects or deselects T1;
    a timer which establishes T1 duration based on the time between T1 selection and deselection, and establishes T2 duration as at least a portion of the remainder of the cycle period, and automatically cyclically repeats the established T1 and T2 durations during each cycle period until T1 is again selected by the switch;
    a signal generator which generates a control signal corresponding to the difference between Ta and T1 or T2 during their respective durations; and
  (d) a power interface comprising:
    a power control switch connectable between a first side of the load and a first side of a power source for the load, and which controls power therethrough in response to the control signal;
    a power storage circuit to provide power for thermostat components and which is connected across the switch so as to be charged when the power control switch is off, said power storage circuit comprising a capacitor and associated charging circuit.

27. A thermostat as defined in claim 26 wherein the cycle period duration stored by said controller is 24 hours.

28. A thermostat as defined in claim 27 wherein the means for defining T1 and T2 values defines T2 as T1 minus a numerical value, and wherein said timer establishes T1 duration as the time between T1 selection and deselection plus an initial fixed period.

29. A thermostat as defined in claim 27 wherein said timer establishes T2 duration as the cycle period minus T1 duration.

30. A thermostat as defined in claim 27 wherein the switch of selecting and deselecting T1 is a pushbutton switch.

31. A heating system including an electric heater one side of which is connected to a first side of a power source, and including a thermostat for cyclically regulating actual ambient temperature, Ta, to either of two values, T1 and T2, for selectable durations, the thermostat comprising:
  (a) a switch for selecting and deselecting T1;
  (b) a sensor for detecting Ta;
  (c) a controller connected to said switch and said sensor, said controller having:
    a means for defining T1 and T2 values which includes a T1 selector which allows T1 to be varied by a user
    a memory to store a cycle period duration;
    a detector to detect when the switch selects or deselects T1;
    a timer which establishes T1 duration based on the time between T1 selection and deselection, and establishes T2 duration as at least a portion of the remainder of the cycle period, and automatically cyclically repeats the established T1 and T2 durations during each cycle period until T1 is again selected by the switch;

a signal generator which generates a control signal corresponding to the difference between Ta and T1 or T2 during their respective durations; and (d) a power interface comprising:

a power control switch connected between a second side of the power source and the heater and which controls power therethrough to the heater in response to the control signal;

a power storage circuit to provide power for thermostat components and which is connected across the switch so as to be charged when the power control switch is off, said power storage circuit comprising a capacitor and associated charging circuit,

* * * * *

IN THE UNITED STATES PATENT AND TRADEMARK OFFICE
CERTIFICATE OF CORRECTION

PATENT NO.: 5,396,048
DATED: March 7, 1995
INVENTOR(S): King et al.

It is certified that an error appears in the above-identified patent and that said Letters Patent is hereby corrected as shown below:

Replace "retirees", column 2, line 13 with --retimes--.

Replace "an", column 5, line 38 with --at--.

Insert --3-- after the word "claim" in column 5, line 60 (claim 1).

Signed and Sealed this

Thirteenth Day of August, 1996

Attest:

BRUCE LEHMAN

*Attesting Officer*    *Commissioner of Patents and Trademarks*